US006498198B2

(12) United States Patent
Pearce

(10) Patent No.: US 6,498,198 B2
(45) Date of Patent: Dec. 24, 2002

(54) FILL FOR PILLOWS AND CUSHIONS

(75) Inventor: Tony M. Pearce, Alpine, UT (US)

(73) Assignee: EdiZONE, LC, Pleasant Grove, UT (US)

( * ) Notice: Subject to any disclaimer, the term of this patent is extended or adjusted under 35 U.S.C. 154(b) by 85 days.

(21) Appl. No.: 09/842,437

(22) Filed: Apr. 25, 2001

(65) Prior Publication Data

US 2001/0042271 A1 Nov. 22, 2001

Related U.S. Application Data

(60) Provisional application No. 60/199,587, filed on Apr. 25, 2000, and provisional application No. 60/216,021, filed on Jul. 3, 2000.

(51) Int. Cl.[7] .................................................. C08J 9/236

(52) U.S. Cl. ........................... 521/54; 521/98; 521/132; 521/134; 521/137; 521/154

(58) Field of Search ............................ 521/54, 98, 132, 521/134, 137, 154

(56) References Cited

U.S. PATENT DOCUMENTS

| | | | | |
|---|---|---|---|---|
| 6,027,676 | A | * | 2/2000 | Detenon |
| 6,319,441 | B1 | * | 11/2001 | Yates |
| 6,413,455 | B1 | * | 7/2002 | Yates |

* cited by examiner

*Primary Examiner*—Morton Foelak
(74) *Attorney, Agent, or Firm*—Parsons Behle & Latimer; Daniel P. McCarthy

(57) ABSTRACT

A fill for cushions that includes a quantity of resilient beads and a quantity of gelatinous particles. The resilient beads are deformable and have shape memory. The gelatinous particles are elongatable and deformable. The gelatinous particles are tacky and tend to hold the resilient beads together in a maintainable yet deformable shape of the user's choosing.

13 Claims, 1 Drawing Sheet

FILL FOR PILLOWS AND CUSHIONS

CLAIM FOR PRIORITY

Applicant claims priority to U.S. Provisional Patent application No. 60/199,587 filed on Apr. 25, 2000 and to U.S. Provisional Patent application No. 60/216,021 filed on Jul. 3, 2000.

BACKGROUND OF THE INVENTION

1. Field of the Invention

This invention relates to the field of fill for cushions of all types, particularly but not limited to cushions for beds, such as head pillows and mattresses, and furniture, including the main cushions for sitting and lying as well as the loose cushions and pillows associated with some types of furniture. Those skilled in the art will recognize the myriad of applications for the cushions of the invention.

2. Background Art

In the background art there were many types of fill for cushions. Cotton, feathers and polyester batting were used but tended to pack down and wear out. Seeds such as buckwheat hulls were used, but tended to be hard and non-conforming. Flowable cushion fill, such as liquid gels, were heavy, expensive and messy. Solid gels, such as shaped gel cushioning articles, required expensive tooling and sophisticated manufacturing techniques. Open and closed cell foams were used, but tended to place high peak pressures on the supported object. Air bladders were used but were prone to hammocking. There is a need for deformable reformable cushioning fill that is inexpensive to manufacture, easy to use yet readily accommodates the shape of a cushioned object.

SUMMARY OF THE INVENTIONS

It is an object of the inventions to provide a cushioning fill that includes resilient beads dispersed in or intermixed with gelatinous elastomer particles. The various features and advantages of such a cushioning fill, and additional objects of the invention will become apparent to persons of ordinary skill in the art on reading the specification in light of the appended drawings.

DETAILED DESCRIPTION OF THE PREFERRED EMBODIMENTS

The inventions rely on use of resilient beads which have an elastic or memory quality to them combined with an elongatable, deformable elastomer. The beads and the elastomer particles are intermixed with each other in a cushion. The elastomer particles may be dispersed in the beads, or the beads may be dispersed in the elastomer particles, or the particles and beads may be used in roughly equal amounts. The elastomer particles and the beads are discrete objects and are not physically attached to each other or held firm in another medium. Consequently, the discrete beads and particles can move with respect to each other to accommodate the shape of a cushioned object, and the beads and particles can be compressed, stretched or otherwise deformed under the weight of a cushioned object.

Figure 1:
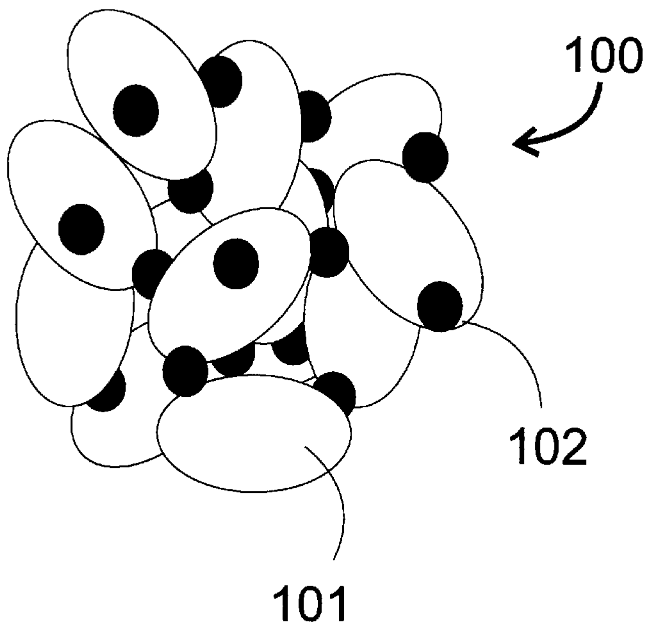
FIG. 1 depicts one embodiment of the invention including resilient beads intermixed with gelatinous elastomer spheres.

Referring to FIG. 1, a cushion fill 100 of the invention is depicted including a quantity of resilient beads 101 intermixed with a quantity of elastomer spheres 102.

Figure 2:
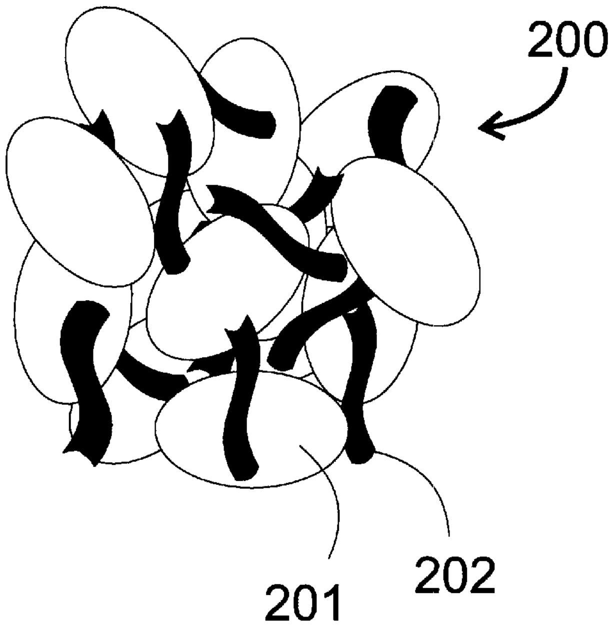
FIG. 2 depicts one embodiment of the invention with resilient beads intermixed with gelatinous elastomer strands.

Referring to FIG. 2, a cushion fill 200 of the invention is depicted including a quantity of resilient beads 201 intermixed with a quantity of elastomer strands 202. Some preferred characteristics of the resilient beads are preferably as depicted in Table 1 below:

TABLE 1

| Resilient Bead Characteristic | Description |
|---|---|
| Shape | Round, oval, elliptical, cylindrical, rectangular, strands, irregular chopped, irregular shredded |
| Specific gravity | From 0.01 to 1.5 |
| Firmness | From 5 IFD to 100 Shore D, with about 11 IFD preferred |
| Material | Open cell foam, closed cell foam, polypropylene, expanded polypropylene, polyethylene, expanded polyethylene, foam rubber, tackified foam rubber, polyurethane foam, tackified polyurethane foam, polystyrene, expanded polystyrene |
| Size | From 0.1 mm to 25 mm |

One preferred bead is a foamed polypropylene bead available from BASF in Wyandotte, Mich. sold under the trade name NEOPOLEN®. These beads are exceptionally light weight with a specific gravity of approximately 0.02. Unlike the less preferred expanded polystyrene beads (sold under the trade name STYROFOAM®), the foamed polypropylene beads do not easily take a permanent set upon being deformed, and are thus much more resilient. Foamed polypropylene beads also have a low coefficient of friction and are relatively slick when in contact with each other facilitating a sliding action when used as a cushion fill material. Although they are not spherical in shape, they are superior to many prior art fills in ability to conform to a cushioned object. The foamed polypropylene beads are closed cell, and as such will not harbor dust mites. Air circulates freely around them. Heat will not build up readily because of their low thermal mass. Additionally, they do not make large amounts of noise when sliding against each other, making them desirable for use as one component in a cushion fill.

Another preferred embodiment of the invention utilizes expanded polyethylene beads intermixed with elastomer particles. Polyethylene beads are even softer and more resilient than foamed polypropylene beads. Some preferred polyethylene beads can be acquired from Kaneka Texas Corporation.

I have also determined that the performance of the fill is vastly improved by the presence of particles, beads, bits, tiny strands or any other shapes of soft elastomer. Examples of soft elastomer and methods for making them are found in U.S. Pat. No. 5,994,450 which is hereby incorporated by reference.

Some preferred characteristics of the soft elastomer used in the invention are listed in Table 2 below:

TABLE 2

| Elastomer Particle Characteristic | Description |
|---|---|
| Shape | spherical, oval, elliptical, cylindrical, rectangular, strands, ribbons, irregular chopped, irregular shredded |
| Specific gravity | From 0.7 to 1.5, or lighter with lightweight fillers |
| Durometer | Less than 25 Shore A |
| Material | SEEPS/oil, SEBS/oil, SEPS/oil, polyurethane gel, silicone gel, PVC gel, highly plasticized elastomer/rubber, or any of these coated onto foam or other elastomeric substrate |
| Size | From 0.1 mm to 25 mm |
| Elongation at Break | Greater than 300%, with 1000% or higher preferred |

One preferred formulation for the elastomer, in parts by weight, is as follows:

10 Septon 4077 SEEPS from Kuraray of Japan

100 White paraffinic mineral oil such as Duoprime 90 from Lyondell 0.25 Anti-oxidant powder such as Irganox 1010 by Ciba Geigy Corp.

0.25 Horizon Blue aluminum lake pigment from Day-Glo Corp.

Some common ranges of constituent components of preferred elastomers of the invention are listed in Table 3 below:

TABLE 3

| Elastomer Constituent | Weight Percent |
|---|---|
| A-B-A triblock copolymer | 2% to 50% |
| Plasticizing Agent | 50% to 98% |
| Anti-Oxidant | 0% to 1% |
| Colorant | 0% to 1% |

However, the formula for the soft elastomer can vary widely. It is preferred that the elastomer have some tackiness, which is generally inherent in such soft elastomers, so that the expanded polyethylene (EPE) beads are highly attracted to the elastomer.

I find that a combination of tiny strands (for example, eyelash size) and beads (for example, garden pea size) is best, though elastomer added in any form seems to improve the pillow or cushion properties. The elastomer strands tend to remove the small amount of noise of the EPE beads contacting each other while adding additional softness, and the pea-size beads significantly add softness. The elastomer in any form adds the great benefit of making the pillow or cushion stay in the shape preferred by the user. For example, the user can form a bed pillow to a shape that properly supports his or her neck and jaw, and during sleep the elastomer will prevent the beads from shifting relative to one another, hence preventing the pillow shape from flattening. This action is thought to occur because of the inherent tackiness and high friction of the elastomer, as well as the deformation of the elastomer around the EPE beads under the pressure of the cushioned object.

Alternatively, the fill may utilize all beads and no elastomer. For example, a fill consisting of one hundred percent expanded polyethylene (EPE) beads has an advantage over prior art fill consisting of, for example, one hundred percent expanded polystyrene (EPS), in that the EPE is slippery (more deformable), quieter, and more resilient. However, a one hundred percent EPE fill is not my preferred embodiment for a bed pillow because the lack of elastomer particles cause the pillow to tend to continue to flow during the night after the initial pillow shape is set by the user. In another alternative, one hundred percent elastomer bits may be used, but this is not preferred for bed pillows because the weight would be excessive, the cost would be high, and the elastomer bits by themselves are more difficult to deform into the preferred shape. However, for other types of cushions than bed pillows, these two alternatives may be preferred.

One preferred bed pillow fill formulation, in parts by weight, is as follows:

0.75 EPE beads 0.50 gel strands of the above formulation, eyelash size (3 mm length)

2.00 gel bits/beads of the above formulation, garden pea size (6 mm diameter)

More general guidelines for combinations of preferred cushion fills of the invention are provided in Table 4 below.

TABLE 4

| Cushion Fill Component | Volume Percent |
|---|---|
| Beads (such as EPE, EPP or other beads) | 20% to 99% |
| Elastomer bits/particles | 0% to 80% |
| Elastomer strands | 0% to 20% |

It is to be understood that the above representations of my invention(s) are preferred embodiments only, and that many other embodiments are possible, including other materials, methods, and combinations. For example, the elastomer bits may be made of any soft and deformable material, for example but not by way of limitation foam rubber or tackified foam rubber, polyurethane foam or tackified polyurethane foam. Or, instead of elastomer, the bits/beads/strands can be of a non-elastomeric soft formable material. Or, instead of EPE or EPP beads or the like, the soft elastomer component can be used with other light-weight soft and resilient materials. For example but not by way of limitation, soft gel bits of the above described formula could be used with bits of foam rubber or bits of polyurethane foam, tackified or otherwise. And, many other applications for the pillows and cushions disclosed herein are possible in addition to those mentioned herein.

I claim:

1. A fill for a cushion comprising:

a quantity of resilient beads, said resilient beads being deformable and having memory so that they return to shape after termination of a deforming force, at least some of said beads including a material selected from the group consisting of open cell foam, closed cell foam, polypropylene, expanded polypropylene, polyethylene, expanded polyethylene, foam rubber, tackified foam rubber, polyurethane foam, tackified polyurethane foam, polystyrene, and expanded polystyrene, said beads having a size of from about 0.1 mm to about 25 mm, said beads having a specific gravity in the range of from about 0.01 to about 1.5, and a quantity of elastomer particles, said resilient beads and said elastomer particles being intermixed, said elastomer particles including an elastomer and a component selected from the group consisting of a tackifying agent and a plasticizing agent, said elastomer particles being deformable and elongatable, and at least some of said elastomer particles exhibiting sufficient surface tackiness to be attracted to said resilient beads.

2. A fill as recited in claim 1 wherein at least some of said elastomer particles include an A-B-A triblock copolymer and a plasticizing oil.

3. A fill as recited in claim 1 wherein said resilient beads are present in the fill in an amount in the range of 20% to 98% by volume and said elastomer particles are present in the fill in the range of 0% to 80% by volume.

4. A fill as recited in claim 1 wherein said elastomer particles have a shape selected from the group consisting of spherical, oval, elliptical, cylindrical, rectangular, strands, ribbons, irregular chopped, and irregular shredded.

5. A fill as recited in claim 1 wherein said elastomer particles have a durometer of less than 25 on the Shore A scale.

6. A fill as recited in claim 1 wherein said resilient beads have a firmness in the range of 5 IFD to 100 Shore D.

7. A fill as recited in claim 1 wherein said resilient beads are dispersed in said elastomer particles.

8. A fill as recited in claim 1 wherein said elastomer particles are dispersed in said resilient beads.

9. A fill for cushions comprising:

a quantity of discrete and unconnected resilient beads, at least some of said resilient beads comprising expanded polymer, said beads being deformable in response to a deforming force, said beads tending to return to shape upon termination of a deforming force, said beads being capable of sliding or rolling with respect to each other under a deforming force, and a quantity of discrete and unconnected gelatinous elastomer particles, at least some of said gelatinous elastomer particles having surface tackiness which tends to cause said gelatinous elastomer particles to have an affinity for said resilient beads, said gelatinous particles being deformable and elongatable, wherein said resilient beads are present in the fill in the range of 20% to 99% by volume, and wherein said elastomer particles are present in the fill in the range of 1% to 80% by volume.

10. A fill as recited in claim 9 wherein said gelatinous elastomer is selected from the group consisting of SEEPS/oil, SEBS/oil, SEPS/oil, polyurethane gel, silicone gel, PVC gel, highly plasticized elastomer/rubber, or any of these coated onto foam or other elastomeric substrate.

11. A fill for a cushion comprising a quantity of resilient beads, said resilient beads being deformable and having memory so that they return to shape after termination of a deforming force, at least some of said beads including a material selected from the group consisting of expanded polypropylene and expanded polyethylene, having a size of from about 0.1 mm to about 25 mm, said beads having a specific gravity in the range of from about 0.01 to about 1.5.

12. A fill as recited in claim 11 wherein the cushion is a bed pillow.

13. A fill for a cushion comprising a quantity of elastomer particles, said elastomer particles being deformable and having memory so that they return to shape after termination of a deforming force, at least some of said particles are selected from the group consisting of SEEPS/oil, SEBS/oil, SEPS/oil, polyurethane gel, silicone gel, PVC gel, highly plasticized elastomer/rubber, or any of these coated onto foam or other elastomeric substrate.

* * * * *